UNITED STATES PATENT OFFICE.

KARL HAGEMANN, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

MONOAZO DYESTUFFS.

1,127,234.     Specification of Letters Patent.     Patented Feb. 2, 1915.

No Drawing.     Application filed April 21, 1914.     Serial No. 833,468.

*To all whom it may concern:*

Be it known that I, KARL HAGEMANN, doctor of philosophy, chemist, citizen of the German Empire, residing at Leverkusen, near Cologne-on-the-Rhine, Germany, have invented new and useful Improvements in Monoazo Dyestuffs, of which the following is a specification.

I have found that new and valuable azo dyes can be obtained by combining the diazo compounds of aminoacidyl derivatives of ortho-aminophenol-sulfonic acids, such as para-aminotoluolsulfonyl-2-amino-4- (or 6-) chlorophenol-6- (or 4-) sulfonic acid, meta-aminobenzoyl-2-amino-4-chlorophenol-6-sulfonic acid, para-aminobenzoyl-2-amino-6-chlorophenol-4-sulfonic acid, meta-aminobenzoyl-2-aminophenol-4-sulfonic acid, with a pyrazolone compound, e. g. ortho-chlorophenylmethylpyrazolon-meta-sulfonic acid, para-chloro-phenylmethylpyrazolon-ortho-sulfonic acid, phenylmethylpyrazolon-sulfonic acid, phenylmethylpyrazolon.

The new dyes dye chrome mordanted wool pure yellow shades.

Mordant colors produced from ortho-aminophenol derivatives with pyrazolones have often been described. But all these colors though they dye yellow shades direct on the woolen fiber, change considerably in shade on being aftertreated with bichrome, the change being from an orange to the red or blue-red side, according to the color used. Contrary to these dyestuffs, the new products alter but very little when aftertreated with bichrome. They give pure yellow shades distinguished by great clearness, fastness to milling and excellent fastness to light. The new dyes are after being dried and pulverized in the shape of their alkaline salts reddish-brown to yellowish powders soluble in water, caustic soda lye and concentrated sulfuric acid, generally with a yellowish coloration. They yield upon reduction with acetic acid and zinc powder an aminoacidyl compound of an ortho-aminophenol sulfonic acid and a 4-aminopyrazolon compound.

Yellowish to pure yellow chrome lakes very fast to light and fast to milling can be produced on the fiber with the new coloring matters.

In order to illustrate the new process more fully the following example is given, the parts being by weight:— 39.2 parts of para-aminotoluol - sulfonyl - ortho - aminophenol-para-chloro-ortho-sulfonic acid are dissolved in 1000 parts of water and 53 parts of soda and diazotized with 42 parts of hydrochloric acid 19.5° Bé. and 6.9 parts of sodium nitrite. The diazo compound thus obtained is then stirred into a cold solution of 32 parts of 1 - ortho - chloro - meta - sulfophenyl - 3-methyl-5-pyrazolon and a solution of 40 parts of sodium bicarbonate is added to obtain a weakly alkaline reaction. After stirring the copulation is soon complete and the dyestuff is salted out and filtered off. It is after being dried and pulverized in the shape of its sodium salt a canary-yellow powder soluble in water and concentrated sufuric acid with a yellowish coloration and yielding upon reduction with zinc powder and acetic acid para-amino-toluol-sulfonyl-2-amino-4-chloro-1-phenol-6-sulfonic acid and 1-(2'-chloro-5'-sulfophenyl) - 3 - methyl - 4-amino-5-pyrazolon. It has in a free state most probably the formula:

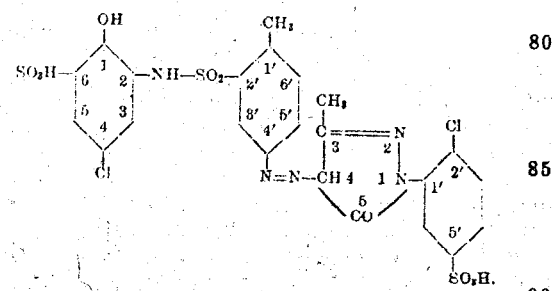

When printed with acetate of chromium on the fiber a pure yellow shade is obtained very fast to light and fast to milling.

I claim:—

1. The herein described new azo dyestuffs being derived from an aminoacidyl compound of an ortho-amino-phenol sulfonic acid and a pyrazolone compound, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an aminoacidyl compound of an ortho aminophenol-sulfonic acid and a 4-aminopyrazolon compound furnishing on the fiber yellowish to pure yellow chrome lakes fast to light and to milling, substantially as described.

2. The herein described new azo dyestuffs being derived from an amino-aryl-acidyl compound of an ortho-amino-phenol-sulfonic acid and a pyrazolone compound, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino-aryl-acidyl compound of an ortho-aminophenol-sulfonic acid and a 4-aminopyrazolon compound furnishing on the fiber yellowish to pure yellow chrome lakes fast to light and to milling, substantially as described.

3. The herein described new azo dyestuffs being derived from an amino-aryl-sulfonyl compound of an ortho-amino-phenol-sulfonic acid and a pyrazolone compound, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino-aryl-sulfonyl compound of an ortho-aminophenol-sulfonic acid and a 4-aminopyrazolon compound furnishing on the fiber yellowish to pure yellow chrome lakes fast to light and to milling, substantially as described.

4. The herein described new azo dyestuffs being derived from an aminoacidyl compound of an ortho-amino-chloro-phenol-sulfonic acid and a pyrazolone compound, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino-acidyl compound of an ortho-amino-chloro-phenol-sulfonic acid and a 4-aminopyrazolon compound furnishing on the fiber yellowish to pure yellow chrome lakes fast to light and to milling, substantially as described.

5. The herein described new azo dyestuffs being derived from an amino-aryl-acidyl compound of an ortho-amino-chlorophenol-sulfonic acid and a pyrazolone compound, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino-aryl-acidyl compound of an ortho-amino-chloro-phenol-sulfonic acid and a 4-aminopyrazolon compound furnishing on the fiber yellowish to pure yellow chrome lakes fast to light and to milling, substantially as described.

6. The herein described new azo dyestuffs being derived from an aminoacidyl compound of an ortho-amino-phenol-sulfonic acid and a pyrazolon sulfonic acid, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino-acidyl compound of an ortho-aminophenol-sulfonic acid and a 4-amino-pyrazolon-sulfonic acid furnishing on the fiber yellowish to pure yellow chrome lakes fast to light and to milling, substantially as described.

7. The herein described new azo dyestuffs being derived from an aminoacidyl compound of an ortho-amino-phenol-sulfonic acid and a phenylmethylpyrazolon compound, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino-acidyl compound of an ortho-aminophenol-sulfonic acid and a 4-amino-phenylmethylpyrazolon compound furnishing on the fiber yellowish to pure yellow chrome lakes fast to light and to milling, substantially as described.

8. The herein described new azo dyestuffs being derived from an aminoacidyl compound of an ortho-aminophenol-sulfonic acid and a chlorophenylmethylpyrazolon compound, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino acidyl compound of an ortho-aminophenol-sulfonic acid and a 4-amino-chlorophenylmethylpyrazolon compound furnishing on the fiber yellowish to pure yellow chrome lakes fast to light and to milling, substantially as described.

9. The herein described new azo dyestuffs being derived from an aminoacidyl compound of an ortho-aminophenol-sulfonic acid and a chlorophenylmethylpyrazolon sulfonic acid, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino-acidyl compound of an ortho-aminophenol-sulfonic acid and a 4-amino-chlorophenylmethylpyrazolon sulfonic acid furnishing on the fiber yellowish to pure yellow chrome lakes fast to light and to milling, substantially as described.

10. The herein described new azo dyestuffs being derived from an amino-aryl-acidyl compound of an ortho-aminochloro-phenol-sulfonic acid and a pyrazolon sulfonic acid, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino-aryl-acidyl compound of an ortho-amino-chloro-phenol-sulfonic acid and a 4-amino-pyrazolon-sulfonic acid furnishing on the fiber yellowish to pure yellow chrome lakes fast to light and to milling, substantially as described.

11. The herein described new azo dyestuffs being derived from an amino-aryl-acidyl compound of an ortho-amino-chloro-phenol-sulfonic acid and a chlorophenylmethylpyrazolon sulfonic acid, which are after being dried and pulverized in the shape of their alkaline salts reddish-brown to yellowish powders soluble in water, caustic soda lye and concentrated sulfuric acid generally with a yellowish coloration; yielding upon reduction with acetic acid and zinc powder an amino-aryl-acidyl compound of an ortho-amino-chloro-phenol-sulfonic acid and a 4-aminochlorophenylmethylpyrazolon sulfonic acid furnishing on the fiber yellowish to pure yellow chrome lakes fast to light and to milling, substantially as described.

12. The herein described new azo dyestuff having in a free state most probably the formula

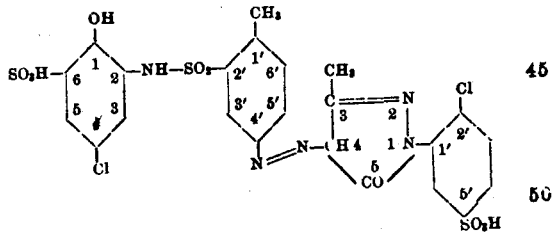

which is after being dried and pulverized in the shape of its sodium salt a canary-yellow powder soluble in water and concentrated sulfuric acid with a yellowish coloration and yielding upon reduction with zinc powder and acetic acid para-amino-toluol-sulfonyl-2-amino-4-chloro-1-phenol-6-sulfonic acid and 1-(2'-chloro-5'-sulfophenyl)-3-methyl-4-amino-5-pyrazolon and furnishing when printed on the fiber together with acetate of chromium pure yellow shades fast to light and to milling, substantially as described.

In testimony whereof I have hereunto set my hand in the presence of two subscribing witnesses.

KARL HAGEMANN.

Witnesses:
 CONIS VANDORY,
 HANS BRÜCKNER.